United States Patent
Iwanaka et al.

(10) Patent No.: US 7,492,114 B2
(45) Date of Patent: Feb. 17, 2009

(54) ELECTRIC VEHICLE DRIVE CONTROL DEVICE AND CONTROL METHOD THEREFOR

(75) Inventors: Makoto Iwanaka, Anjo (JP); Shigeki Takami, Anjo (JP); Ryuji Ibaraki, Nishikamo-gun (JP); Tooru Matsubara, Toyota (JP); Hiroyuki Shibata, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 107 days.

(21) Appl. No.: 11/586,597

(22) Filed: Oct. 26, 2006

(65) Prior Publication Data

US 2007/0103106 A1 May 10, 2007

(30) Foreign Application Priority Data

Oct. 26, 2005 (JP) .............................. 2005-311608

(51) Int. Cl.
 *H02P 7/00* (2006.01)
(52) U.S. Cl. ..................... 318/432; 318/433; 318/434
(58) Field of Classification Search ................. 318/432, 318/433, 434, 8, 9, 12, 13, 15, 77, 140, 153; 477/5; 74/335
 See application file for complete search history.

(56) References Cited

U.S. PATENT DOCUMENTS 5,944,630 A  8/1999 Omote

| | | |
|---|---|---|
| 2003/0078134 A1 | 4/2003 | Kojima et al. |
| 2005/0107207 A1* | 5/2005 | Imazu et al. .................. 477/35 |
| 2005/0209760 A1 | 9/2005 | Tabata et al. |

FOREIGN PATENT DOCUMENTS

| | | |
|---|---|---|
| JP | A-51-49364 | 4/1976 |
| JP | A-9-331603 | 12/1997 |
| JP | A-10-4606 | 1/1998 |
| JP | A-10-243502 | 9/1998 |
| JP | A-2000-2327 | 1/2000 |
| JP | A-2000-104575 | 4/2000 |
| JP | A-2003-127681 | 5/2003 |
| JP | A-2005-12894 | 1/2005 |
| JP | A-2005-061498 | 3/2005 |
| JP | A-2005-256883 | 9/2005 |

* cited by examiner

*Primary Examiner*—Karen Masih
(74) *Attorney, Agent, or Firm*—Oliff & Berridge, PLC

(57) ABSTRACT

An electric vehicle drive control device includes a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; a transmission that shifts a speed of a rotation transferred from the transmission shaft; and a controller that: calculates an inertia compensating torque that compensates for a change in a rotation speed caused by inertia while the transmission performs shifting; and corrects a target torque for the first electric motor in accordance with the inertia compensating torque.

16 Claims, 6 Drawing Sheets

|  | C0 | C1 | C2 | B1 | B2 | F1 |
|---|---|---|---|---|---|---|
| 1ST |  | ○ |  |  | (○) | ○ |
| 2ND |  | ○ |  | ○ |  |  |
| 3RD | ○ | ○ |  |  |  |  |
| 4TH | ○ |  |  | ○ |  |  |
| REV |  |  | ○ |  | ○ |  |

ELECTRIC VEHICLE DRIVE CONTROL DEVICE AND CONTROL METHOD THEREFOR

INCORPORATION BY REFERENCE

The disclosure of Japanese Patent Application No. 2005-311608 filed on Oct. 26, 2005 including the specification, drawings and abstract is incorporated herein by reference in its entirety.

BACKGROUND

The present invention relates to an electric vehicle drive control device and a control method therefor.

There exists a vehicle driving apparatus that is installed in an electric vehicle such as a hybrid vehicle. In the vehicle driving apparatus, a planetary gear unit with a sun gear, a ring gear, and a carrier transfers a part of the engine torque to a generator and transfers the rest of the engine torque to driven wheels. The carrier is connected to the engine, and the ring gear and a motor are connected to the driven wheels via a transmission. Also, the sun gear is connected to the generator. Accordingly, the rotation output from the ring gear and the motor is transferred to the driven wheels so that a driving force is generated.

During a running of the hybrid vehicle, while the engine is driven and an engine torque is generated such that the engine torque is transferred to the driven wheels via the transmission, if an engine rotation speed changes before and after shifting is performed by the transmission, a shift shock will occur. To cope with this problem, a generator rotation speed is controlled such that the change in the engine rotation speed is suppressed before and after shifting (for example, Japanese Patent Application Publication No. JP-A-2005-61498).

SUMMARY

However, in the conventional vehicle driving apparatus, when the generator rotation speed is controlled, the engine rotation speed sometimes changes because of inertia from the generator itself and a control delay. In such a situation, an inertia torque is generated in the engine that corresponds to the amount of change in the engine rotation speed. Consequently, a shift shock occurs that may give the driver a sense of discomfort. In addition, a change in the driving force of the hybrid vehicle resulting from a change in the engine rotation speed may also feel strange to the driver.

The present invention thus provides, among other things, an electric vehicle drive control device and a control method therefor that solve the problems with the conventional vehicle driving apparatus and with which an engine rotation speed does not change before and after shifting, so that a driver does not feel a sense of discomfort or unease.

According to a first exemplary aspect of the invention, an electric vehicle drive control device includes a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; a transmission that shifts a speed of a rotation transferred from the transmission shaft; and a controller that: calculates an inertia compensating torque that compensates for a change in a rotation speed caused by inertia while the transmission performs shifting; and corrects a target torque for the first electric motor in accordance with the inertia compensating torque.

According to a second exemplary aspect of the invention, a control method for an electric vehicle drive control device comprising a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; and a transmission that shifts a speed of a rotation transferred from the transmission shaft, includes calculating an inertia compensating torque that compensates for a change in a rotation speed caused by inertia while the transmission performs shifting; and correcting a target torque for the first electric motor in accordance with the inertia compensating torque.

BRIEF DESCRIPTION OF THE DRAWINGS

Various exemplary embodiments of the invention will be described with reference to the drawings, wherein.

DETAILED DESCRIPTION OF EMBODIMENTS

Hereinafter, an embodiment of the present invention will be explained in detail, with reference to the drawings. In the explanation, an electric vehicle drive control device and a control method therefor to drive a hybrid vehicle, which is an electric vehicle, will be described.

Figure 1:
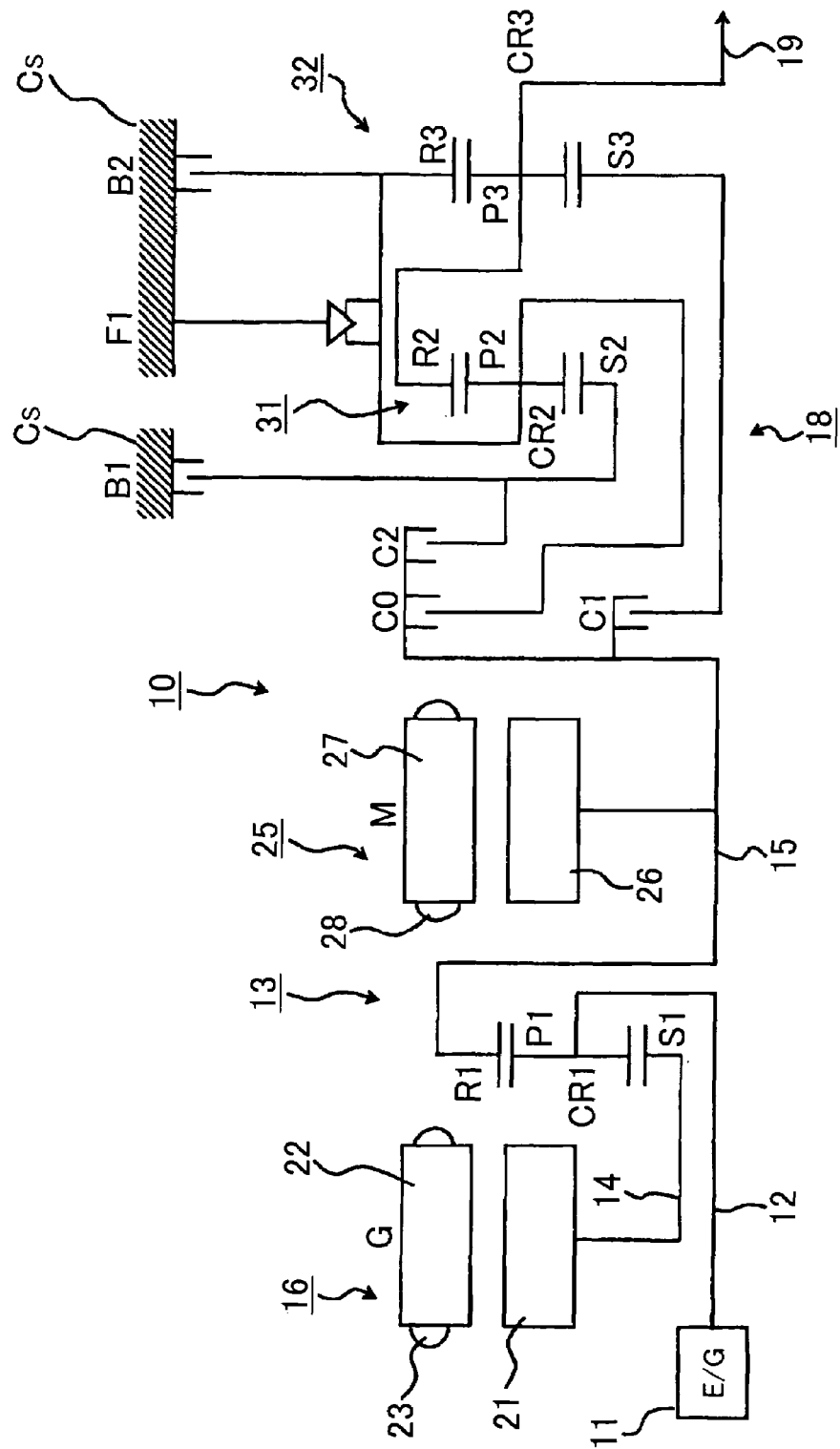
FIG. 1 is a conceptual drawing of an engine and a vehicle driving apparatus according to an embodiment of the present invention.

FIG. 1 is a conceptual drawing of an engine and a vehicle driving apparatus for a hybrid vehicle according to the embodiment of the present invention.

In the drawing, reference numeral 10 denotes a vehicle driving apparatus, whereas reference numeral 11 denotes an engine (E/G), and reference numeral 12 denotes an output shaft from which a rotation and an engine torque TE that are generated by driving the engine 11 are output. The output shaft 12 also serves as an input shaft for the vehicle driving apparatus 10. In addition, reference numeral 13 denotes a planetary gear unit that serves as an example of a differential device for distributing the engine torque TE input via the output shaft 12. Reference numerals 14 and 15 denote examples of transmission shafts that receive a rotation generated by the planetary gear unit 13 and also receive the engine torque TE distributed by the planetary gear unit 13. Reference numeral 16 denotes a generator (G) that serves as an example of a first electric motor as well as a first electric machine, and is connected to the planetary gear unit 13 via the transmission shaft 14. Reference numeral 25 denotes a motor (M) that serves as an example of a second electric motor as well as a second electric machine, and is connected to the planetary gear unit 13 via the transmission shaft 15.

Reference numeral 18 denotes a transmission that is connected to the planetary gear unit 13 and to the motor 25 via the transmission shaft 15. The transmission 18 shifts the speed of the rotation input via the transmission shaft 15, and outputs the rotation whose speed has been shifted to an output shaft 19.

Figure 4:
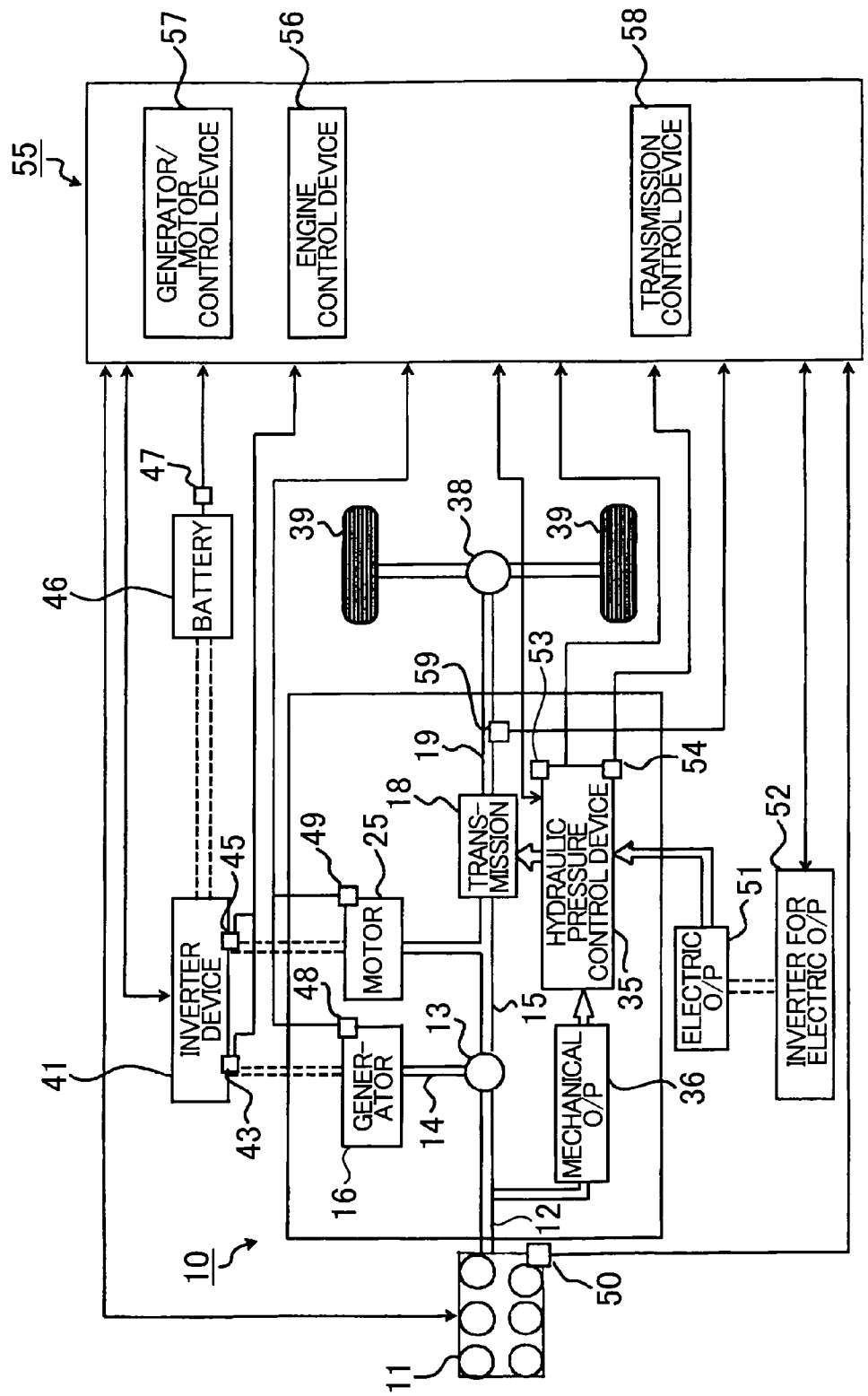
FIG. 4 is a block diagram of an electric vehicle drive control device according to the embodiment of the present invention.

A differential mechanism 38 (FIG. 4) is connected to the output shaft 19. The differential 38 mechanism distributes the rotation transferred via the output shaft 19 and transfers such rotation to driven wheels 39 (FIG. 4). As described here, the engine 11, the generator 16, the motor 25, and the driven wheels 39 are mechanically connected to one another.

The planetary gear unit 13 comprises a single planetary gear and includes a first sun gear S1, a first pinion P1 that meshes with the first sun gear S1, a first ring gear R1 that meshes with the first pinion P1, and a first carrier CR1 that rotatably supports the first pinion P1. The first sun gear S1 is connected to the generator 16 via the transmission shaft 14. The first ring gear R1 is connected to the motor 25 and to the transmission 18 via the transmission shaft 15. The first carrier CR1 is connected to the engine 11 via the output shaft 12. The first sun gear S1, the first ring gear R1, and the first carrier CR1 structure a first differential element. The first sun gear S1 structures a first rotational element. The first ring gear R1 and the first carrier CR1 structure a second rotational element and a third rotational element, respectively.

The generator 16 is fixed to the transmission shaft 14. The generator 16 includes a rotor 21 that is rotatably disposed, a stator 22 that is positioned around the rotor 21, and a coil 23 that is wound around the stator 22. The generator 16 generates alternating electric currents that are in U-phase, V-phase, and W-phase, using the rotation transferred via the transmission shaft 14. Also, the generator 16 generates a torque of the generator 16, i.e., a generator torque TG, as necessary with the U-phase, V-phase, and W-phase electric currents, and outputs the generator torque TG generated to the transmission shaft 14.

A generator brake (not shown) is provided between the rotor 21 and a case Cs of the vehicle driving apparatus 10. By engaging the generator brake, it is possible to make the rotor 21 stationary and to stop the rotation of the generator 16 mechanically.

The motor 25 is fixed to the transmission shaft 15. The motor 25 includes a rotor 26 that is rotatably disposed, a stator 27 that is positioned around the rotor 26, and a coil 28 that is wound around the stator 27. The motor 25 generates a torque of the motor 25, i.e., a motor torque TM, using U-phase, V-phase, and W-phase electric currents that are supplied from a battery (not shown), and outputs the motor torque TM generated to the transmission shaft 15.

The transmission 18 includes a first gear unit 31 and a second gear unit 32, each of which is a single planetary gear. The transmission 18 also includes clutches C0 to C2, brakes B1 and B2, and a one-way clutch F1 that serve as friction engagement elements.

The first gear unit 31 includes a second sun gear S2, a second pinion P2 that meshes with the second sun gear S2, a second ring gear R2 that meshes with the second pinion P2, and a second carrier CR2 that rotatably supports the second pinion P2. The second gear unit 32 includes a third sun gear S3, a third pinion P3 that meshes with the third sun gear S3, a third ring gear R3 that meshes with the third pinion P3, and a third carrier CR3 that rotatably supports the third pinion P3.

The second sun gear S2, the second ring gear R2, and the second carrier CR2 structure a second differential element. The third sun gear S3, the third ring gear R3, and the third carrier CR3 structure a third differential element.

The second sun gear S2 is connected to the transmission shaft 15 via the clutch C2 and is also connected to the case Cs via the brake B1. The second ring gear R2 is connected to the third carrier CR3 and the output shaft 19. The second carrier CR2 is connected to the third ring gear R3 and is also connected to the transmission shaft 15 via the clutch C0. The second carrier CR2 is further connected to the case Cs via the one-way clutch F1 and the brake B2. The third sun gear S3 is connected to the transmission shaft 15 via the clutch C1.

Next, the operation of the transmission 18 will be explained.

Figures 2, 3:
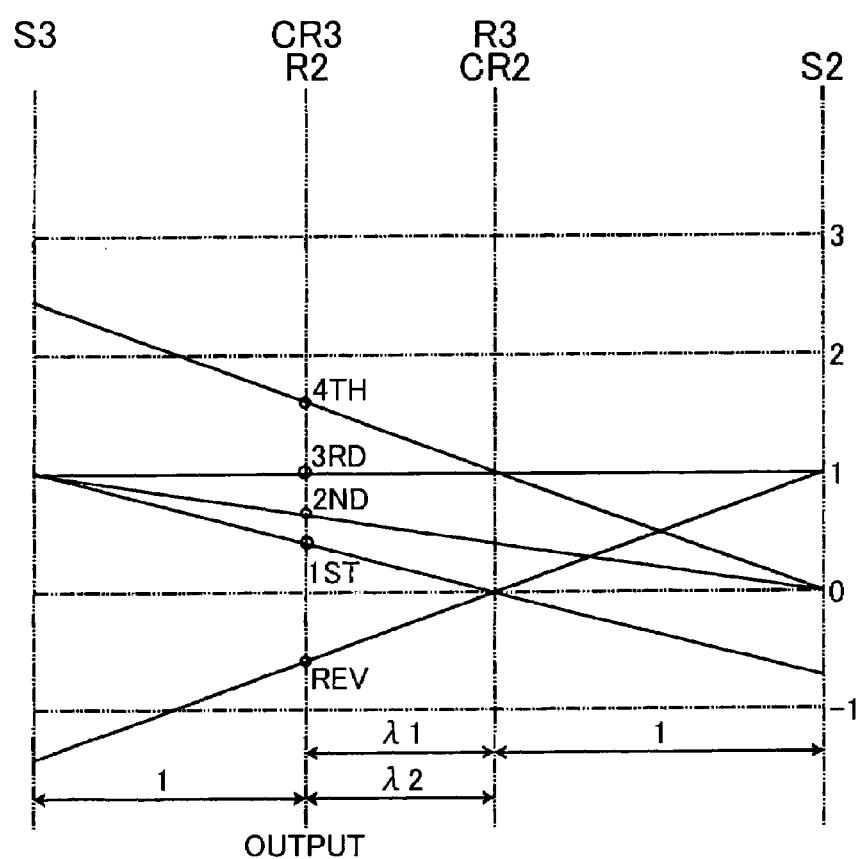
FIG. 2 is a drawing of an operation table for a transmission according to the embodiment of the present invention.
FIG. 3 is a velocity diagram for the transmission according to the embodiment of the present invention.

FIG. 2 is a drawing of an operation table for the transmission according to the embodiment of the present invention. FIG. 3 is a velocity diagram for the transmission according to the embodiment of the present invention.

In the drawings, reference characters C0 to C2 denote the clutches and reference characters B1 and B2 denote the brakes. Reference character F1 denotes the one-way clutch. Reference characters 1ST, 2ND, 3RD, and 4TH denote first to fourth forward speeds. Reference character REV denotes a gear for driving in reverse. Circles in the table indicate engagement of the clutches C0 to C2 and the brakes B1 and B2, and that the one-way clutch F1 is in a locked state. The circle in parentheses indicates that the brake B2 is engaged when an engine brake is used. Blank areas in the table indicate release of the clutches C0 to C2 and the brakes B1 and B2, and that the one-way clutch F1 is in a free state.

Reference character S2 denotes the second sun gear, and reference character R2 denotes the second ring gear. Reference character CR2 denotes the second carrier, S3 denotes the third sun gear, R3 denotes the third ring gear, and CR3 denotes the third carrier.

Reference character $\lambda 1$ denotes a ratio of the number of teeth in the second sun gear S2 to the number of teeth in the second ring gear R2, and reference character $\lambda 2$ denotes a ratio of the number of teeth in the third sun gear S3 to the number of teeth in the third ring gear R3. Numerals $-1, 0, 1, 2$, and 3 shown in FIG. 3 denote relative rotation speeds when the rotation speed of an input rotation is expressed as 1.

With the transmission 18 structured as described above, at the first forward speed, the clutch C1 is engaged and the one-way clutch F1 is in a locked state. In this situation, due to engagement of the clutch C1, the rotation of the transmission shaft 15 is input to the third sun gear S3, so that the third sun gear S3 is rotated at a rotation speed 1. Meanwhile, due to the locked state of the one-way clutch F1, the rotation speed of the third ring gear R3 is zero (0), so that a rotation reduced to a first-gear speed is output from the third carrier CR3 to the output shaft 19.

At the second forward speed, the clutch C1 and the brake B1 are engaged. In this situation, due to engagement of the clutch C1, the rotation of the transmission shaft 15 is input to the third sun gear S3, so that the third sun gear S3 is rotated at the rotation speed 1. Meanwhile, due to engagement of the brake B1, the rotation speed of the second sun gear S2 is zero, so that a rotation reduced to a second-gear speed, which is higher than the first-gear speed, is output from the third carrier CR3 to the output shaft 19.

At the third forward speed, the clutches C0 and C1 are engaged. In this situation, due to engagement of the clutch C0, the rotation of the transmission shaft 15 is input to the second carrier CR2, so that the second carrier CR2 is rotated at the rotation speed 1. Meanwhile, due to engagement of the clutch C1, the rotation of the transmission shaft 15 is input to the third sun gear S3, so that the third sun gear S3 is rotated at the rotation speed 1. As a result, the transmission 18 is in a state of direct coupling, and thus, rotation at a third-gear speed, which is the same as the rotation speed of the transmission shaft 15, is output from the third carrier CR3 to the output shaft 19.

At the fourth forward speed, the clutch C0 and the brake B1 are engaged. In this situation, due to engagement of the clutch C0, the rotation of the transmission shaft 15 is input to the second carrier CR2, so that the second carrier CR2 is rotated at the rotation speed 1. Meanwhile, due to engagement of the brake B1, the rotation speed of the second sun gear S2 is zero, so that a rotation increased to a fourth-gear speed, which is higher than the rotation speed of the transmission shaft 15, is output from the third carrier CR3 to the output shaft 19.

When the vehicle is driven in reverse, the clutch C2 and the brake B2 are engaged. In this situation, due to engagement of the clutch C2, the rotation of the transmission shaft 15 is input to the second sun gear S2, so that the second sun gear S2 is rotated at the rotation speed 1. Meanwhile, due to engagement of the brake B2, the rotation speed of the third ring gear R3 is zero, so that a rotation in a reverse direction of the rotation of the transmission shaft 15 is output from the third carrier CR3 to the output shaft 19.

Next, the electric vehicle drive control device will be explained.

FIG. 4 is a block diagram of the electric vehicle drive control device according to the embodiment of the present invention.

In the drawing, the reference numeral 10 denotes the vehicle driving apparatus, whereas the reference numeral 11 denotes the engine, and reference numeral 12 denotes the output shaft. The vehicle driving apparatus 10 includes the planetary gear unit 13, the transmission shafts 14 and 15, the generator 16, the motor 25, the transmission 18, the output shaft 19, a hydraulic pressure control device 35, and a pump (a mechanical O/P) 36. The hydraulic pressure control device 35 supplies and drains oil to and from a hydraulic servo (not shown) by which the clutches C0 to C2 and the brakes B1 and B2 in the transmission 18 are engaged and disengaged. The pump 36 is operated by the rotation of the engine 11 and mechanically generates a predetermined hydraulic pressure, which is supplied to the hydraulic pressure control device 35.

A differential mechanism 38 is connected to the output shaft 19. The differential mechanism 38 distributes the rotation transferred via the output shaft 19 and transfers such rotation to driven wheels 39.

Reference numeral 41 denotes an inverter device that includes an inverter for driving the generator 16 and an inverter for driving the motor 25. Reference numeral 43 denotes an electric current sensor that serves as an electric current detecting unit and detects the electric current flowing in the generator 16. Reference numeral 45 denotes an electric current sensor that serves as an electric current detecting unit and detects the electric current flowing in the motor 25. Reference numeral 46 denotes the battery, and reference numeral 47 denotes a battery voltage sensor that serves as a battery voltage detecting unit. Reference numeral 48 denotes a rotation speed sensor that serves as a rotation speed detecting unit and detects a generator rotation speed NG. Reference numeral 49 denotes a rotation speed sensor that serves as a rotation speed detecting unit and detects the rotation speed of the motor 25, i.e., a motor rotation speed NM. Reference numeral 50 denotes a rotation speed sensor that serves as a rotation speed detecting unit and detects an engine rotation speed NE. Reference numeral 53 denotes a hydraulic pressure sensor that serves as a hydraulic pressure detecting unit and detects the hydraulic pressure in the hydraulic pressure control device 35. Reference numeral 54 denotes an oil temperature sensor that serves as an oil temperature detecting unit and detects the oil temperature in the hydraulic pressure control device 35. Reference numeral 59 is a vehicle speed sensor that serves as a vehicle speed detecting unit and detects a vehicle speed V, based on the rotation speed of the output shaft 19. The engine rotation speed NE, the generator rotation speed NG, and the motor rotation speed NM structure drive state judgment indicators that are respectively used for judging the drive states of the engine 11, the generator 16, and the motor 25. The rotation speed sensors 48 to 50 structure a drive state judgment indicator detecting unit. The vehicle speed V structures a running load of the hybrid vehicle. The vehicle speed sensor 59 serves as a running load detecting unit.

Reference numeral 51 denotes a pump (an electric O/P) that electrically generates a predetermined hydraulic pressure and supplies the generated hydraulic pressure to the hydraulic pressure control device 35. Reference numeral 52 denotes an inverter for the electric O/P that drives the pump 51.

Reference numeral 55 denotes a vehicle control device that controls the entire hybrid vehicle; 56 denotes an engine control device that controls the engine 11; 57 denotes a generator/motor control device that controls the generator 16 and the motor 25; and 58 denotes a transmission control device that controls the transmission 18. The vehicle control device 55, the engine control device 56, the generator/motor control device 57, and the transmission control device 58 function as computers when used alone or in combination, and perform computational processing based on various types of programs and data.

The vehicle control device 55 sends an engine control signal to the engine control device 56 so that the engine control device 56 configures the engine 11 to start or stop.

The vehicle control device 55 specifies an engine target rotation speed NE*, which is a target value for the engine rotation speed NE; a generator target torque TG*, which is a target value for the generator torque TG; and a motor target torque TM*, which is a target value for the motor torque TM. The generator/motor control device 57 specifies a generator target rotation speed NG*, which is a target value for the generator rotation speed NG, and a motor torque correction value δTM, which is a correction value for the motor torque TM.

Shift speed setting processing means (a shift speed setting processing unit) (not shown) included in the transmission control device 58 performs shift speed setting processing. The shift speed setting processing means reads an acceleration opening degree Ac, which expresses the engine load detected based on the amount by which an accelerator pedal (not shown) is pressed down, and also reads the vehicle speed V and the like. The shift speed setting processing means then specifies a shift speed by referring to a shift map in a recording device (not shown) that is included in the transmission control device 58. Subsequently, shift request processing means (a shift request processing unit) (not shown) included in the transmission control device 58 performs shift request processing. The shift request processing means judges whether shifting is necessary based on a current shift speed and the specified shift speed. If it is judged that shifting is necessary, the shift request processing means generates a shift request. Shift processing means (a shift processing unit) (not shown) included in the transmission control device 58 performs shift processing. The shift processing means generates a shift output according to the shift request and executes shift control.

Vehicle required torque calculation processing means (a vehicle required torque calculation processing unit) (not shown) included in the vehicle control device 55 performs vehicle required torque calculation processing. The vehicle required torque calculation processing means reads the vehicle speed V, the accelerator opening degree Ac and the like, and calculates a vehicle required torque TO* that is necessary in order to run the hybrid vehicle.

Next, vehicle required output calculation processing means (a vehicle required output calculation processing unit) (not shown) included in the vehicle control device 55 performs vehicle required output calculation processing. The vehicle required output calculation processing means calculates a driver required output PD by multiplying the vehicle required torque TO* by the vehicle speed V. The vehicle required output calculation processing means also calculates a battery charge/discharge required output PB, based on a battery remaining amount SOC detected by a battery remaining amount detecting sensor (not shown). Further, the vehicle required output calculation processing means calculates a vehicle required output PO by adding the driver required output PD to the battery charge/discharge required output PB.

Subsequently, engine target drive state setting processing means (an engine target drive state setting processing unit) (not shown) included in the vehicle control device 55 performs engine target drive state setting processing. The engine target drive state setting processing means determines a driving point of the engine 11, based on the vehicle required output PO, the accelerator opening degree Ac, and the like. The engine target drive state setting processing means then determines the engine torque TE at the driving point as an engine target torque TE* and also determines the engine rotation speed NE at the driving point as an engine target rotation speed NE*. Further, the engine target drive state setting processing means sends the engine target rotation speed NE* to the engine control device 56.

Start request processing means (a start request processing unit) (not shown) included in the engine control device 56 performs start request processing. The start request processing means judges whether the engine 11 is positioned at a drive area. If the engine 11 is positioned at the drive area but is not being driven, start processing means (a start processing unit) (not shown) included in the engine control device 56 performs start processing and generates an engine start request to start the engine 11. Next, engine start processing means (an engine start processing unit) (not shown) included in the engine control device 56 performs engine start processing and generates an engine start signal when the engine start request has been generated. As a result, the engine 11 is driven and the engine torque TE is generated so as to run the hybrid vehicle.

As mentioned earlier, while the engine torque TE is generated and transferred to the driven wheels 39 via the transmission 18 so as to run the hybrid vehicle, a shift shock will occur if the transmission 18 performs shifting and the engine rotation speed NE changes before and after shifting.

To cope with this situation, generator control processing means (a generator control processing unit) (not shown) included in the generator/motor control device 57 performs generator control processing so that the engine rotation speed NE does not change before and after shifting. The generator control processing means controls the generator rotation speed NG, based on the engine target rotation speed NE*.

In order to make that happen, generator target rotation speed calculation processing means (a generator target rotation speed calculation processing unit) included in the generator control processing means performs generator target rotation speed calculation processing. The generator target rotation speed calculation processing means reads the motor rotation speed NM detected by the rotation speed sensor 49, and calculates a ring gear rotation speed NR1 based on a gear ratio from the transmission shaft 15 to the first ring gear R1. The generator target rotation speed calculation processing means also reads the engine target rotation speed NE* determined in the engine target drive state setting processing, and calculates and determines the generator target rotation speed NG* using a rotation speed relational expression for the planetary gear unit 13, which is based on the ring gear rotation speed NR1 and the engine target rotation speed NE*. Generator torque calculation processing means (a generator torque calculation processing unit) included in the generator control processing means performs generator torque calculation processing. The generator torque calculation processing means reads the generator rotation speed NG detected by the rotation speed sensor 48, executes PI control based on a rotation speed difference ΔNG between the generator rotation speed NG and the generator target rotation speed NG*, and calculates and determines the generator target torque TG*. In this situation, the larger the rotation speed difference ΔNG, the larger the generator target torque TG*. It is also taken into consideration whether the values are positive or negative.

When the generator target torque TG* is calculated in this manner, generator drive processing means (a generator drive processing unit) included in the generator control processing means performs generator drive processing. The generator drive processing means generates an electric current instruction value and a voltage instruction value in accordance with the generator target torque TG*, and drives the generator 16. As a result, it is possible to control the generator rotation speed NG.

However, when the generator rotation speed NG is controlled, a change in the engine rotation speed NE is due to an inertia Ig of the generator 16 itself and a control delay leads to the generation of an inertia torque TIe in the engine 11, which corresponds to the amount of change in the engine rotation speed NE. Consequently, a shift shock occurs that may give the driver a sense of discomfort.

In addition, a change in the driving force of the hybrid vehicle resulting from a change in the engine rotation speed may also feel strange to the driver.

To cope with this situation, the generator control processing means controls the generator 16 so that the change in the engine rotation speed NE is suppressed, in correspondence with the inertia Ig.

Figure 5:
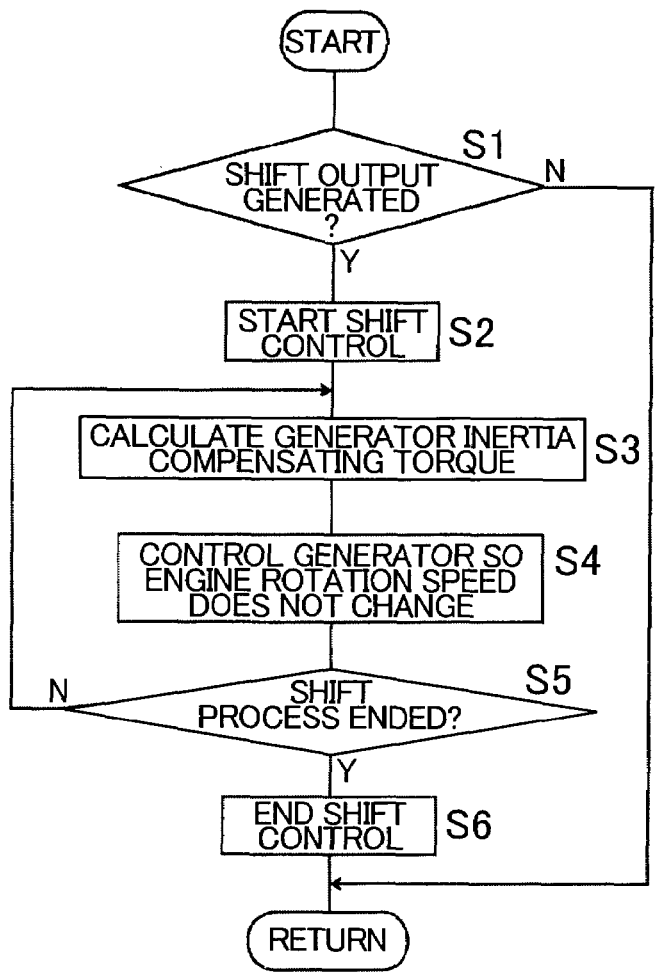
FIG. 5 is a flowchart that shows an operation of the vehicle control device according to the embodiment of the present invention.
Figure 6:
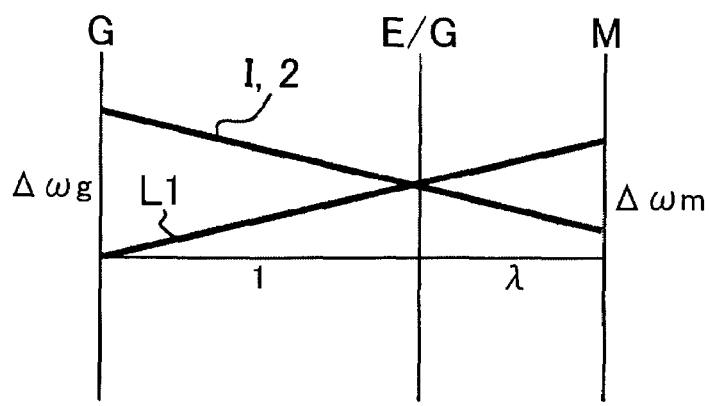
FIG. 6 is a drawing that shows an example of a change in the velocity diagram when shifting is performed according to the embodiment of the present invention.

FIG. 5 is a flowchart that shows an operation of the vehicle control device according to the embodiment of the present invention. FIG. 6 is a drawing that shows an example of a change in the velocity diagram when shifting is performed according to the embodiment of the present invention.

For example, as shown in FIG. 6, when the transmission performs shifting, the velocity diagram changes from a pre-shift state indicated by a line L1 to a post-shift state indicated by a line L2. In this situation, when the rotation speed of the transmission shaft 15 becomes lower, the motor rotation speed NM becomes lower by Δωm. At this time, if the engine rotation speed NE changes due to the change in the motor rotation speed NM, a shift shock will occur. To cope with this situation, the generator rotation speed NG is made higher by Δωg so that the engine rotation speed NE does not change before and after shifting.

However, when the generator rotation speed NG is controlled, if it is not possible to make the generator rotation speed NG higher by Δωg because of the inertia Ig of the generator 16 itself or a control delay, the engine rotation speed NE becomes lower by a corresponding amount. Thus, the inertia torque TIe is generated in the engine 11 in correspondence with the amount of change in the engine rotation speed NE. Consequently, a shift shock occurs that may give the driver a sense of discomfort.

In addition, a change in the driving force of the hybrid vehicle resulting from a change in the engine rotation speed NE may also feel strange to the driver.

When a shift request is generated, the shift processing means generates a shift output and starts the shift control. The shift request and the shift output structure a shift start indicator based on which the transmission 18 starts the shift control.

Subsequently, compensating torque calculation processing means (a compensating torque calculation processing unit) included in the generator control processing means performs compensating torque calculation processing. The compensating torque calculation processing means calculates an inertia compensating torque Tgi for the generator 16 that compensates for the change in the engine rotation speed NE caused by the inertia Ig from shifting, based on an angular acceleration αg and the inertia Ig of the generator 16. In order to achieve this, the compensating torque calculation processing means calculates the angular accelerations αg and αm as shown below.

$$\alpha g = \Delta \omega g / \Delta t$$

$$\alpha m = \Delta \omega m / \Delta t$$

where, Δt denotes the control cycle of a CPU included in the generator/motor control device 57, and αm denotes the angular acceleration of the motor 25. Further, if the ratio of the number of teeth in the first sun gear S1 to the number of teeth in the first ring gear R1 is expressed as λ, the following expression is satisfied.

$$\alpha m : \alpha g = \lambda : 1$$

Thus, it is possible to express the angular acceleration αg, using the ratio λ and the angular acceleration αm as shown below.

$$\alpha g = 1/\lambda \cdot \alpha m$$

Thus, it is possible to express the inertia compensating torque Tgi as follows.

$$Tgi = Ig \cdot \alpha g$$

$$= Ig/\lambda \cdot \alpha m$$

Next, target torque correction processing means (a target torque correction processing unit) included in the generator control processing means performs target torque correction processing. The target torque correction processing means reads the generator target torque TG* and corrects the read generator target torque TG* in accordance with the inertia compensating torque Tgi. Thus, according to the present embodiment, when the target torque correction processing means uses the generator target torque TG* to create a corrected generator target torque TG*' that serves as a corrected target torque, the following expression is satisfied.

$$TG^{*'} = TG^* + Tgi$$

Consequently, the generator drive processing means generates the electric current instruction value and the voltage instruction value according to the corrected generator target torque TG*' and drives the generator 16. As a result, it is possible to prevent the situation where the engine rotation speed NE changes because of the inertia Ig and the control delay. It is also possible to prevent the inertia torque TIe from being generated in the engine 11. Thus, the engine torque TE can be kept constant. Further, the occurrence of shift shock can be prevented in order to avoid giving the driver a sense of discomfort.

In addition, it is possible to prevent the driving force of the hybrid vehicle from changing so that the driver does not feel unease as a result.

The shift control is executed as explained above. Subsequently, the shift processing means reads the motor rotation speed NM, calculates a changing rate of the motor rotation speed NM, and judges whether the shift process has ended, based on whether the changing rate is smaller than a threshold value. When the shift process ends, the shift processing means ends the shift control.

Next, the flowchart will be explained.

Step S1: It is judged whether a shift output is generated. If a shift output has been generated, the procedure proceeds to step S2. If no shift output has been generated, the procedure returns to the start.

Step S2: The shift control is started.

Step S3: The inertia compensating torque Tgi for the generator 16 is calculated.

Step S4: The generator 16 is controlled so that the engine rotation speed NE does not change.

Step S5: It is judged whether the shift process is ended. If the shift process has ended, the procedure proceeds to step S6. If the shift process has not ended, the procedure returns to step S3.

Step S6: The shift control is ended, and the procedure returns to the start.

Next, the operations of the vehicle driving apparatus 10 in the case where the generator 16 is driven based on the generator target torque TG* and in the case where the generator 16 is driven based on the corrected generator target torque TG*' will be explained.

Figure 7:
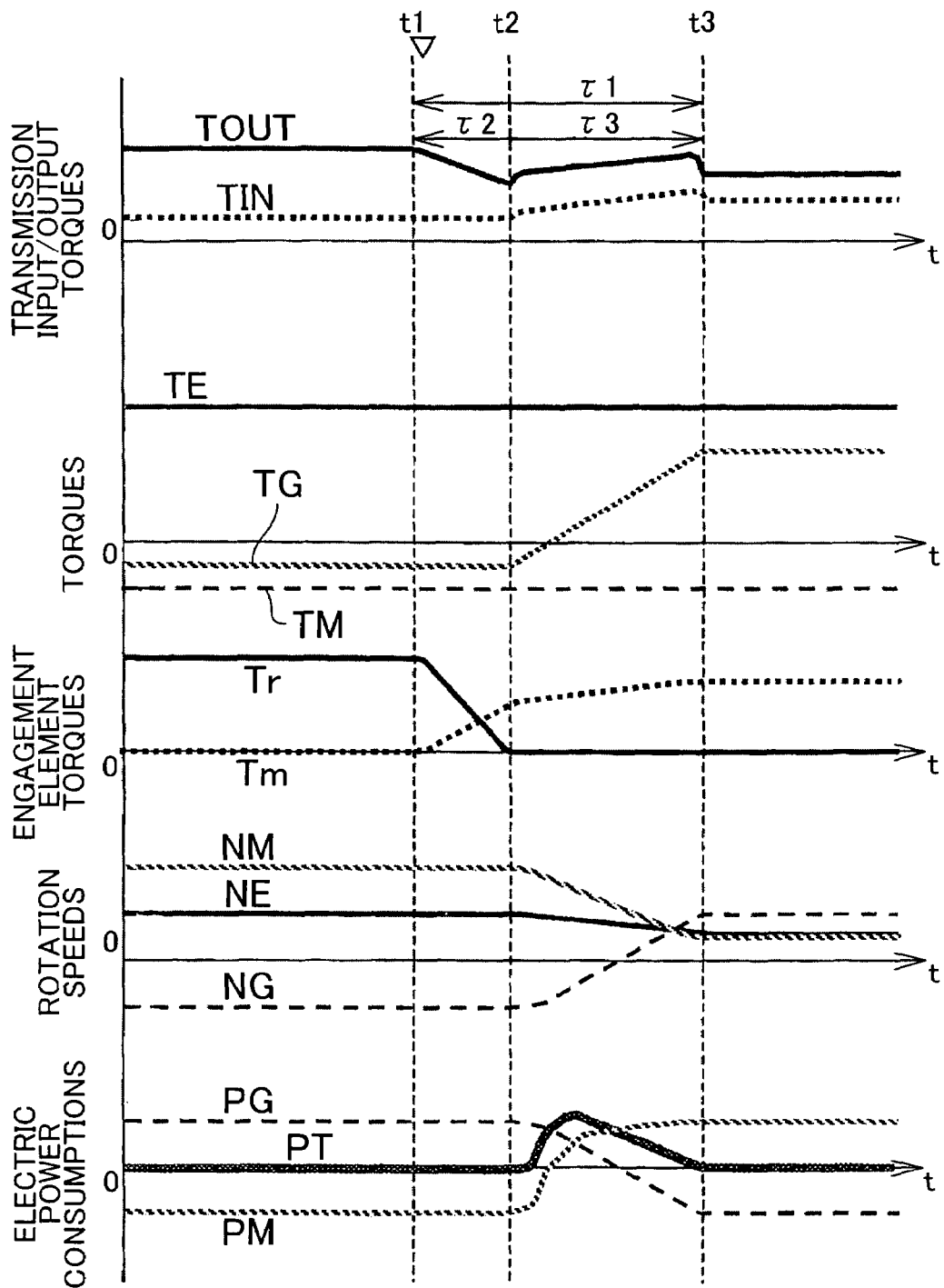
FIG. 7 is a time chart that shows an operation of the vehicle driving apparatus when a generator is driven based on a generator target torque.
Figure 8:
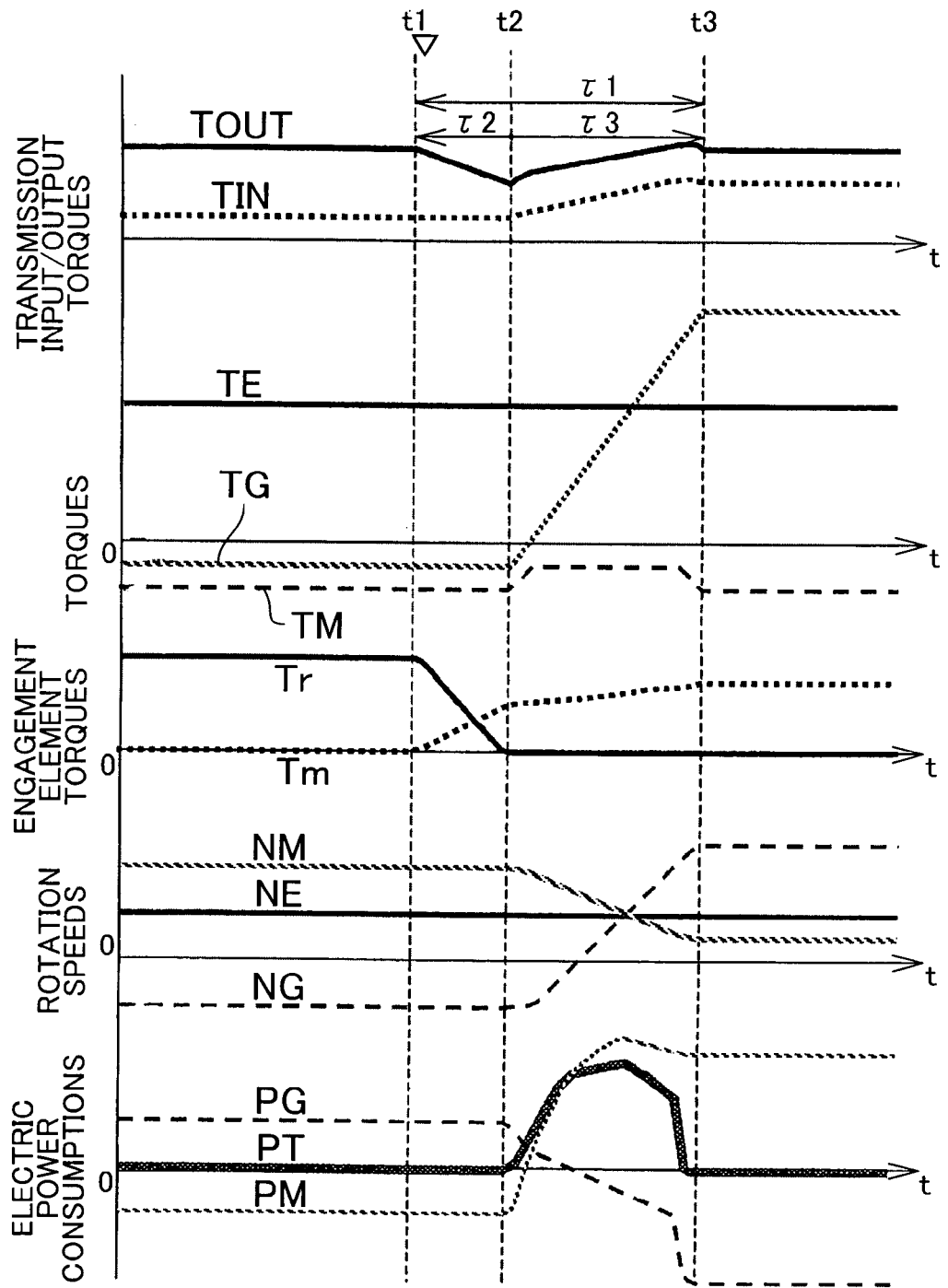
FIG. 8 is a time chart that shows an operation of the vehicle driving apparatus according to the embodiment of the present invention.

FIG. 7 is a time chart that shows the operation of the vehicle driving apparatus when the generator is driven based on the generator target torque. FIG. 8 is a time chart that shows the operation of the vehicle driving apparatus according to the embodiment of the present invention.

In FIGS. 7 and 8, reference character τ1 denotes a section from the time when shifting is started and to the time when shifting is ended. Reference character τ2 denotes a torque phase that is a section where the clutches C0 (FIG. 1) to C2 and the brakes B1 and B2 are engaged and disengaged after shifting is started, and there is no change in the input rotation of the transmission 18. Reference character τ3 denotes an inertia phase that is a section where the clutches C0 to C2 and the brakes B1 and B2 are engaged and disengaged, and there is a change in the input rotation of the transmission 18.

Shown in the drawings are: an output torque TOUT that is output to the output shaft 19 while shifting is performed; an input torque TIN that is input to the transmission 18; torques that include the engine torque TE, the generator torque TG, and the motor torque TM; engagement element torques that include an engagement-side torque Tm of the friction engagement element engaged while shifting is performed and a release-side torque Tr of the friction engagement element released while shifting is performed; rotation speeds that include the engine rotation speed NE, the generator rotation speed NG, and the motor rotation speed NM; an electric power consumption PG of the generator 16; an electric power consumption PM of the motor 25; and a total electric power consumption PT obtained by adding the electric power consumptions PG and PM together.

In FIG. 7, at a timing t1, a shift output is generated and the shift control is started. A shift signal to upshift the transmission is then generated so that shifting is started, and the torque phase τ2 starts. In the torque phase τ2, the engagement-side torque Tm becomes larger, whereas the release-side torque Tr becomes smaller, and the torques are distributed. In this situation, the engine rotation speed NE, the generator rotation speed NG, and the motor rotation speed NM do not change.

The torque phase τ2 subsequently ends at a timing t2, and the inertia phase τ3 starts. At a timing t3, the inertia phase τ3 ends. In the inertia phase τ3, the motor rotation speed NM becomes lower, and the generator rotation speed NG becomes higher in accordance with the generator target rotation speed NG*. However, because of the inertia Ig and a control delay, the generator rotation speed NG does not become high enough. Thus, the engine rotation speed NE becomes lower by a corresponding amount.

Meanwhile in FIG. 8, at the timing t1, a shift output is generated and the shift control is started. A shift signal to upshift the transmission is then generated so that shifting is started, and the torque phase τ2 starts. In the torque phase τ2, the engagement-side torque Tm becomes larger, whereas the release-side torque Tr becomes smaller, and the torques are distributed. In this situation, the engine rotation speed NE, the generator rotation speed NG, and the motor rotation speed NM do not change.

The torque phase τ2 subsequently ends at the timing t2, and the inertia phase τ3 starts. At the timing t3, the inertia phase τ3 ends. In the inertia phase τ3, the motor rotation speed NM becomes lower. The generator rotation speed NG is set equivalent to the generator target rotation speed NG*, which is calculated with the corrected generator target torque TG*' that was corrected based on the inertia compensating torque Tgi. Thus, the engine rotation speed NE can be kept constant.

The present invention is not limited to the above embodiment, and may be modified in various forms based on the spirit of the present invention. Such modifications shall be regarded as within the scope of the present invention.

According to an exemplary aspect of the invention, the inertia compensating torque is calculated in order to compensate for a change in the rotation speed caused by inertia while the transmission performs shifting. The target torque for the first electric motor is then corrected in accordance with the inertia compensating torque. Thus, a change in the engine rotation speed due to inertia and a control delay can be prevented, and it is also possible to prevent an inertia torque from being generated in the engine. As a result, the occurrence of shift shock can be prevented in order to avoid giving the driver a sense of discomfort. In addition, it is possible to prevent the driving force of the electric vehicle from changing so that the driver does not feel uneasy as a result.

The invention claimed is:

1. An electric vehicle drive control device, comprising:
   an output shaft connected to driven wheels;
   a first electric motor;
   a second electric motor;
   a differential device that includes first, second, and third rotational elements, wherein the first rotational element is connected to the first electric motor, the second rotational element is connected to the second electric motor via a transmission shaft, and the third rotational element is connected to an engine;
   a transmission that shifts a speed of a rotation transferred from the transmission shaft, and outputs a rotation whose speed has been shifted to the output shaft; and
   a controller that:
   calculates a target rotation speed for the first electric motor based on an engine target rotation speed so that an engine rotation speed does not change before and after shifting;
   calculates a target torque for the first electric motor based on the target rotation speed for the first electric motor;
   calculates an inertia compensating torque that compensates for a change in the engine rotation speed caused by inertia while the transmission performs shifting; and
   corrects the target torque for the first electric motor in accordance with the inertia compensating torque.

2. The electric vehicle drive control device according to claim 1, wherein the controller calculates the inertia compensating torque when a shift start indicator is generated, the shift start indicator being used as a basis for the transmission to start shift control.

3. The electric vehicle drive control device according to claim 2, wherein the shift start indicator is a shift output generated in accordance with a shift request.

4. The electric vehicle drive control device according to claim 1, wherein the controller calculates a change in a rotation speed of the first electric motor based on a change in a rotation speed of the second electric motor that is due to shifting, and then calculates the inertia compensating torque based on inertia of the first electric motor and the change in the rotation speed of the first electric motor.

5. The electric vehicle drive control device according to claim 1, wherein the controller calculates the inertia compensating torque so that the engine rotation speed and an engine torque do not change during shifting.

6. The electric vehicle drive control device according to claim 1, wherein
   the differential device is a planetary gear unit formed from a single planetary gear, and
   the transmission is provided with first and second gear units formed from single planetary gears.

7. The electric vehicle drive control device according to claim 1, wherein
   the first electric motor is a generator,
   the second electric motor is a drive motor, and
   in the differential device, the first rotational element is a first sun gear connected to the generator, the second rotational element is a first ring gear connected to the drive motor and the transmission, and the third rotational element is a first carrier connected to the engine.

8. The electric vehicle drive control device according to claim 7, wherein
   the first gear unit in the transmission is provided with a second sun gear, a second ring gear, and a second carrier,
   the second gear unit in the transmission is provided with a third sun gear, a third ring gear, and a third carrier,
   the second sun gear is connected to the first ring gear via a clutch and connected to a case via a brake,
   the second ring gear is connected to the third carrier and an output shaft,
   the second carrier is connected to the third ring gear, connected to the first ring gear via the clutch, and connected to the case via a one-way clutch and the brake, and
   the third sun gear is connected to the first ring gear via the clutch.

9. The electric vehicle drive control device according to claim 1, wherein the controller calculates the inertia compensating torque based on an angular acceleration and an inertia of the first electric motor.

10. The electric vehicle drive control device according to claim 1, wherein the controller calculates the inertia compensating torque for the first electric motor that compensates for the change in the rotation speed of the engine.

11. A control method for an electric vehicle drive control device comprising an output shaft connected to driven wheels; a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; and a transmission that shifts a speed of a rotation transferred from the transmission shaft, and outputs a rotation whose speed has been shifted to the output shaft, the control method comprising:

calculating a target rotation speed for the first electric motor based on an engine target rotation speed so that an engine rotation speed does not change before and after shifting;

calculating a target torque for the first electric motor based on the target rotation speed for the first electric motor;

calculating an inertia compensating torque that compensates for a change in the engine rotation speed caused by inertia while the transmission performs shifting; and correcting the target torque for the first electric motor in accordance with the inertia compensating torque.

12. The method according to claim 11, wherein the inertia compensating torque is calculated when a shift start indicator is generated, the shift start indicator being used as a basis for the transmission to start shift control.

13. The method according to claim 12, wherein the shift start indicator is a shift output generated in accordance with a shift request.

14. The method according to claim 11, wherein the inertia compensating torque is calculated based on inertia of the first electric motor and a change in a rotation speed of the second electric motor that is due to shifting.

15. The method according to claim 11, wherein the inertia compensating torque is calculated so that the engine rotation speed and an engine torque do not change during shifting.

16. The method according to claim 11, wherein the inertia compensating torque is calculated based on an angular acceleration and an inertia of the first electric motor.

* * * * *